United States Patent [19]
Kato et al.

[11] Patent Number: 5,918,275
[45] Date of Patent: Jun. 29, 1999

[54] SENSOR FOR ENGINE CONTROL

[75] Inventors: Masahiko Kato; Yukio Nakamura; Katsuhisa Ootaki, all of Hamamatsu, Japan

[73] Assignee: Sanshin Kogyo Kabushiki Kaisha, Hamamatsu, Japan

[21] Appl. No.: 08/824,678

[22] Filed: Mar. 26, 1997

[30] Foreign Application Priority Data

Mar. 26, 1996 [JP] Japan ................................. 8-070468

[51] Int. Cl.⁶ .................................................. G01M 15/00
[52] U.S. Cl. ............................................ 73/116; 73/35.07
[58] Field of Search .............................. 73/35.01, 35.03, 73/35.06, 35.07, 35.08, 35.09, 35.12, 115, 116, 117.3

[56] References Cited

U.S. PATENT DOCUMENTS

| | | | |
|---|---|---|---|
| 4,292,841 | 10/1981 | Wesley | 73/119 A |
| 4,422,321 | 12/1983 | Muller et al. | 73/35.01 |
| 4,441,021 | 4/1984 | Olson et al. | 73/117.3 |
| 4,444,169 | 4/1984 | Kirisawa et al. | |
| 4,665,737 | 5/1987 | Britsch et al. | 73/35.06 |
| 4,805,442 | 2/1989 | Okumura et al. | 73/35.03 |
| 4,930,478 | 6/1990 | Plee et al. | 73/116 |
| 5,067,463 | 11/1991 | Remboski et al. | 73/116 |
| 5,099,681 | 3/1992 | Dils | 73/35.07 |
| 5,099,683 | 3/1992 | Remboski, Jr. et al. | 73/116 |
| 5,241,853 | 9/1993 | Tsuei et al. | |
| 5,637,792 | 6/1997 | Kimura et al. | 73/116 |
| 5,712,422 | 1/1998 | Kato | |

*Primary Examiner*—Richard Chilcot
*Assistant Examiner*—Eric S. McCall
*Attorney, Agent, or Firm*—Knobbe, Martens, Olson & Bear LLP

[57] ABSTRACT

An oxygen sensor and sensor mounting arrangement for a control system of an internal combustion engine is disclosed. The oxygen sensor senses the actual combustion conditions in a combustion chamber. An insulating arrangement is provided including an insulated conduit and an insulated sensor body for maintaining high temperature of the sensor element by avoiding heat transfer from the conduit and sensor body to the engine body.

2 Claims, 9 Drawing Sheets

SENSOR FOR ENGINE CONTROL

FIELD OF THE INVENTION

This invention relates to an engine sensor and more particularly to an improved engine sensor assembly particularly utilized for engine control.

BACKGROUND OF THE INVENTION

In order to improve the performance of internal combustion engines, not only in the terms of specific output and fuel economy, but also so as to increase the exhaust emission control, a variety of types of control systems have been proposed. One particularly effective control system employs a sensor that senses the air/fuel ratio in the combustion chamber. By utilizing the output of this sensor, it is possible to make finite adjustments in the fuel and air control to maintain the desired fuel/air ratio.

The sensors normally utilized for this purpose are of a type which generally require them to be at a predetermined temperature in order to provide a reliable output. For example, a sensor commonly used for this purpose is an oxygen ($O_2$) sensor. These oxygen sensors sense the amount of oxygen in the combustion products. By sensing the amount of oxygen present in the combustion products, it is possible to accurately determine the fuel/air ratio. Of course, this type of sensor must be at the proper operating temperature to provide a reliable output.

The use of oxygen sensors for engine control in relationship to two-cycle engines presents a significant problem. With a two-cycle engine, unlike four-cycle engines, there is a risk that the combustion products that are sampled may not be pure combustion products. That is, with a two-cycle engine there is a time during the scavenging cycle when the combustion products may become mixed with a fresh charge. If this occurs, then improper readings will be generated and engine control will not be successful.

Therefore, there have been proposed systems wherein the sensor communicates with the engine combustion chamber through a port and at such a time when primarily pure combustion products will be in the combustion chamber. This means that the sensor is not exposed continuously to the hot combustion gases.

Therefore, there is a risk with this type of installation that the sensor can cool between successive readings and the output signal can become unreliable.

It is, therefore, a principal object of this invention to provide an improved arrangement for communicating a combustion condition sensor with the combustion chamber of an engine.

It is a further object of this invention to provide a combustion condition sensor that is insulated so that it will maintain its temperature between successive samplings.

It is a still further object of this invention to provide an improved sensor arrangement for an engine wherein the path that delivers the combustion products to the sensor and the sensor itself is configured to ensure the maintenance of the operating temperature of the sensor.

SUMMARY OF THE INVENTION

This invention is adapted to be embodied in an engine sensor for an internal combustion engine having a combustion chamber. The sensor is operative to provide an output signal indicative of the fuel/air ratio in the combustion chamber. A conduit arrangement interconnects the combustion chamber with a chamber in which the sensor is positioned. At least the conduit that supplies the combustion products to the sensor chamber is insulated so as to maintain the sensor temperature at the desired temperature.

Means are provided for insulating the sensor from the engine. Preferably, this means comprises a gasket positioned between a body of the sensor and a body of the engine to which the sensor is mounted.

Preferably, the conduit comprises an insulating sleeve. The sleeve has tapered ends abutting tapered sections of a passage in the body of the engine and a body of the sensor. In addition, the sleeve has a reduced diameter section between its ends which cooperates with the passage through the engine in which the sleeve is positioned to form an insulating chamber around a portion of the sleeve.

DETAILED DESCRIPTION OF THE PREFERRED EMBODIMENTS OF THE INVENTION

Figure 1:
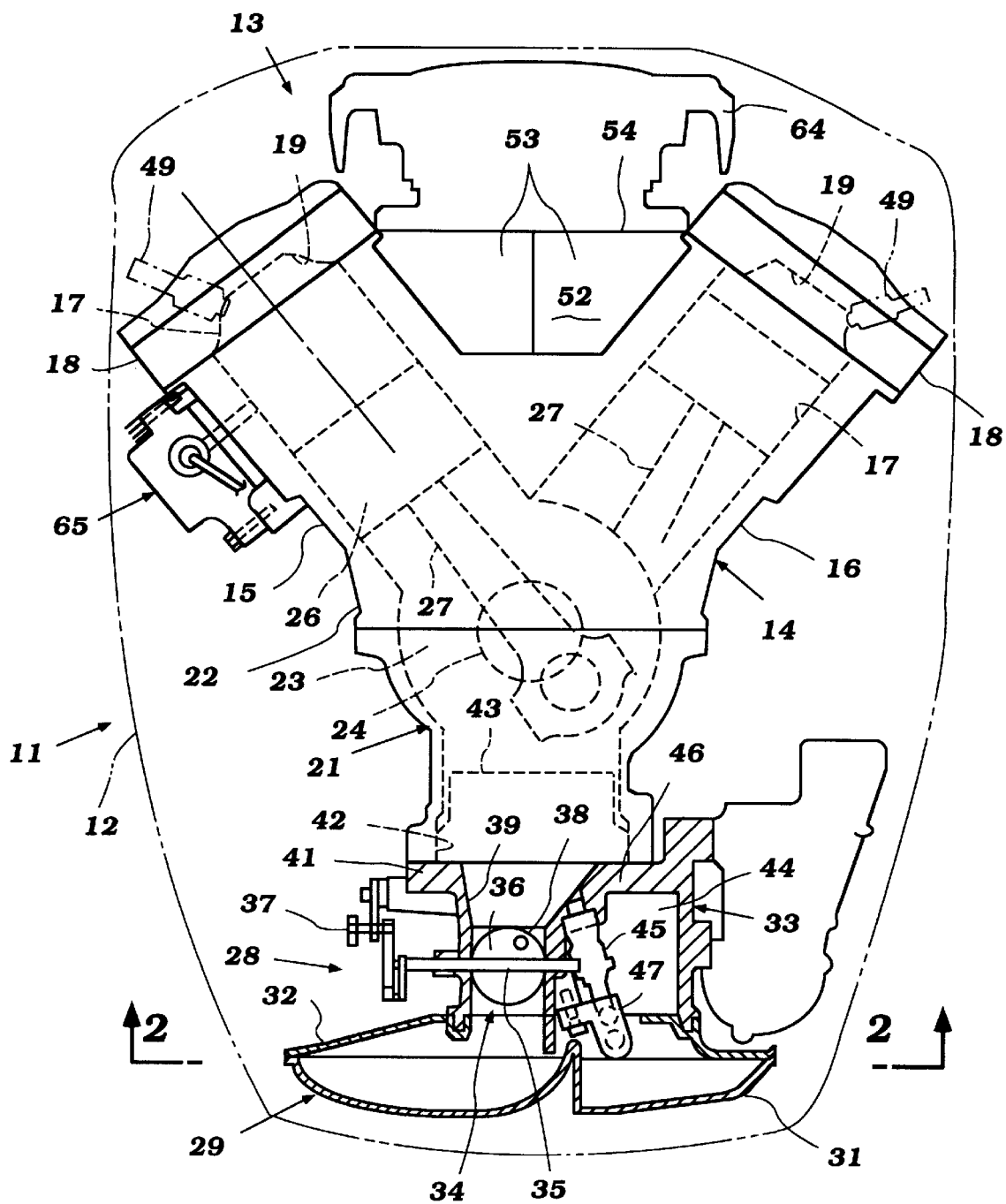
FIG. 1 is a top plan view of an outboard motor constructed in accordance with an embodiment of the invention, showing primarily the power head with the protective cowling being illustrated in phantom and a portion of the engine broken away and shown in cross section.

Referring now in detail to the drawings and initially to FIG. 1, the power head of an outboard motor, indicated generally by the reference numeral 11 is depicted in top plan view with the protective cowling 12 shown in phantom. The power head further includes an internal combustion engine, indicated generally by the reference numeral 13 and which has a construction as will be described. It is to be understood that the invention is described in conjunction with an outboard motor because this is the type of environment where the invention can frequently be utilized. This is because the invention is directed to a control system and sensor therefor that has primary value with two-cycle engines. Such engines are frequently employed as the power plant in outboard motors. Therefore, the invention is described in conjunction with such an application.

Because the invention deals primarily with the sensor for the engine and the control system, therefor, the full details of the outboard motor 11 are not illustrated nor will they be described. Reference may be had to any known construction for those details of the outboard motor which are not illustrated or described and which may be required to facilitate the practicing of the invention in such an application.

The engine 13, as noted, operates on a two-cycle crankcase compression principle. In the illustrated embodiment, the engine 13 is of the V-6 type. Therefore, it is provided with a cylinder block, indicated generally by the reference numeral 14, having a pair of cylinder banks 15 and 16 which are disposed at a V angle thereto. Each cylinder bank 15 and 16 is provided with three vertically spaced horizontally extending cylinder bores 17. Although the invention is described in conjunction with an engine of this configuration, it will be readily apparent to those skilled in the art how the invention can be practiced with engines having other cylinder numbers and other configurations. Certain facets of the invention, however, have certain practical application to engines of this configuration, as will become apparent to those skilled in the art.

The upper ends of the cylinder banks 15 and 16 have detachably connected thereto cylinder head assemblies 18. This connection may be accomplished in any known manner and the cylinder head assemblies 18 close the upper ends of the cylinder bores 17. Each cylinder head assembly 18 is provided with a plurality of recesses 19 which cooperate with the cylinder bore 17 to form in part the combustion chambers of the engine.

A crankcase member, indicated generally by the reference numeral 21 is fixed to a skirt portion 22 of the cylinder block 14 and closes the ends of the cylinder bores 17 opposite from the cylinder head assemblies 18. The crankcase member 21 and cylinder block skirt 22 define a crankcase chamber 23 in which a crankshaft 24 is supported for rotation in a known manner. As is typical with outboard motor practice, the engine 13 is disposed so that the crankshaft 24 rotates about a vertically disposed axis.

Figure 3:
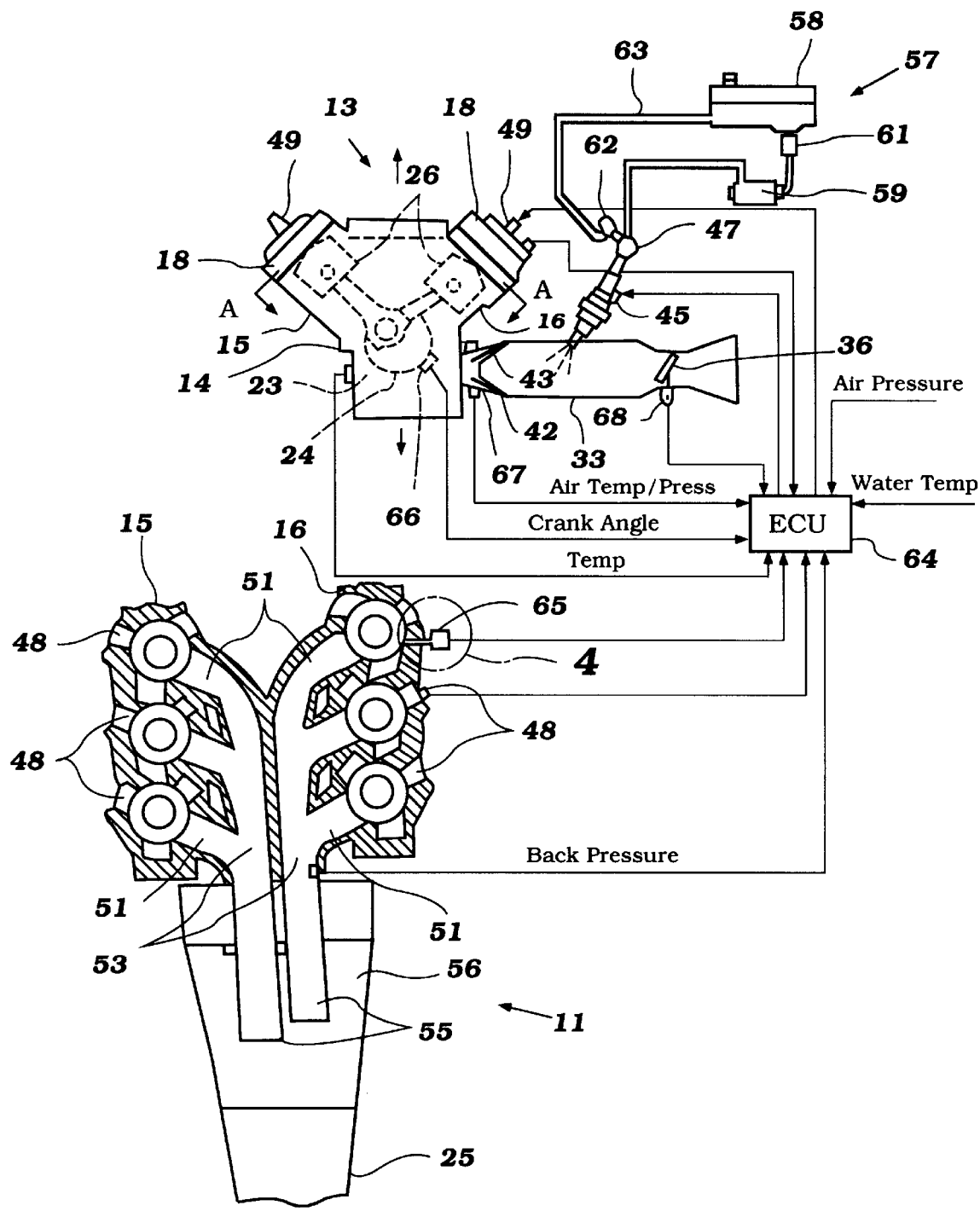
FIG. 3 is multi-part schematic view that depicts the control system for the engine operation and shows, in the upper portion, a schematic view of the engine and its relationship to the control and fuel supply and, in the lower left-hand portion, a view that represents a cross-sectional view showing the exhaust system for the outboard motor in part schematically.

This facilitates connection of the crankshaft 24 to a drive shaft which is not shown but which is journaled for rotation in a drive shaft housing assembly, shown in FIG. 3 schematically and indicated by the reference numeral 25. At the lower end of this drive shaft housing assembly 25 there is provided a propulsion device of any known type which is driven by a suitable transmission for powering an associated watercraft.

The crankshaft 24 is driven by pistons 26 that are slidably supported in the cylinder bores 17. The pistons 26 are connected by piston pins (not shown) to connecting rods 27. The connecting rods 27 are in turn journaled on the throws of the crankshaft 24 in a manner which is well known in this art.

As is typical with two-cycle crankcase compression engines, the crankcase chamber 23 is provided with a sealing arrangement so that the portion thereof associated with each of the cylinder bores 17 is sealed from the others. A fuel/air charge is delivered to these sealed crankcase chambers 23 by means of an induction system, indicated generally by the reference numeral 28.

Figure 2:
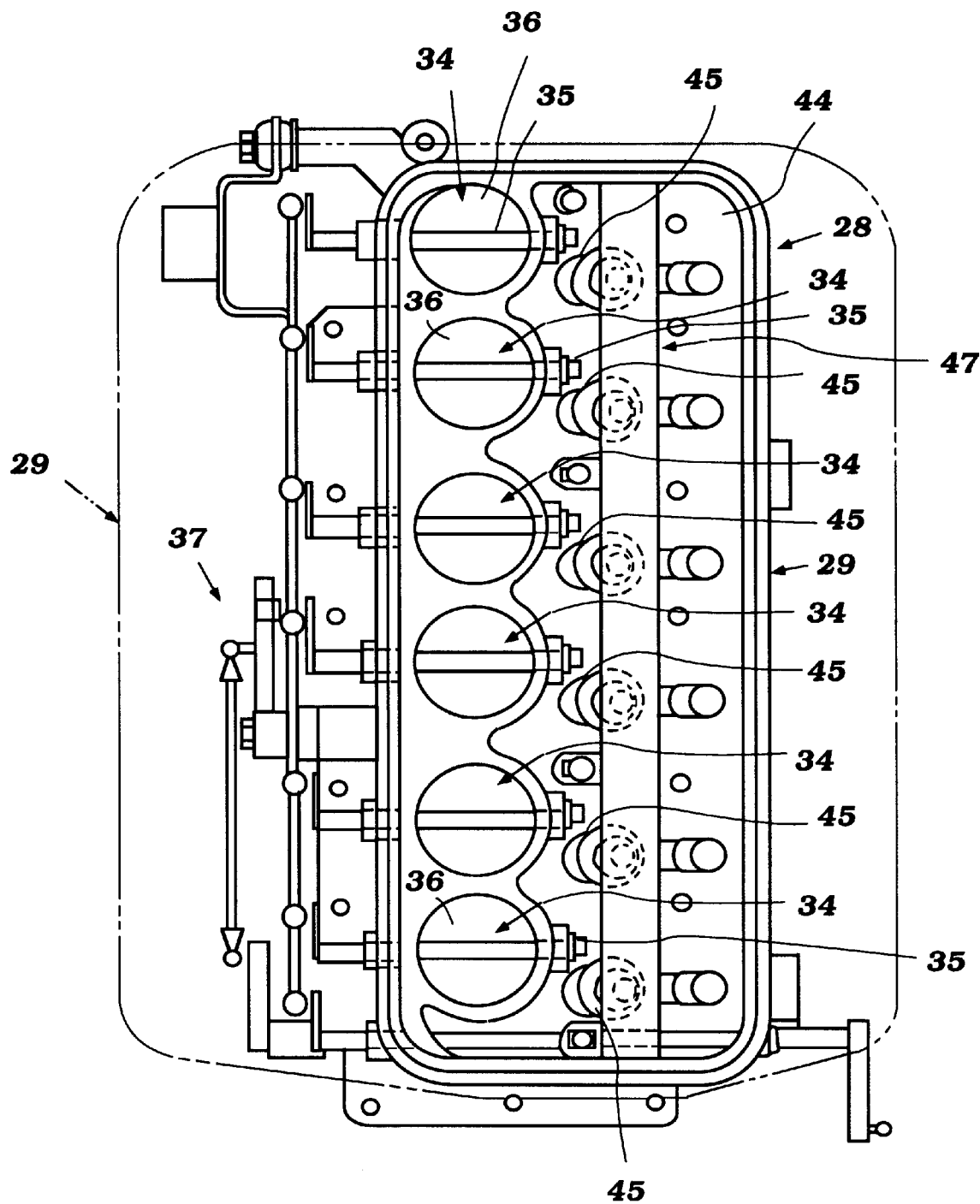
FIG. 2 is an enlarged cross-sectional view taken generally along the line 2—2 of FIG. 1 and shows the throttle arrangement and fuel injection system for the engine.

This induction system will be described by further reference to FIG. 2 in addition to FIG. 1 wherein more details of the induction system 28 appear. The induction system 28 is comprised of an air inlet device, indicated generally by the reference numeral 29 and which is shown in FIG. 2 with its cover plate 31 removed so as to more clearly show the details of the induction system. This inlet device 29 draws atmospheric air that has been admitted to the interior of the protective cowling 12 through an atmospheric air inlet opening formed therein in a known manner.

A main body portion 32 of the air inlet device is affixed in relationship to a throttle body, indicated generally by the reference numeral 33 and which is formed with a plurality of intake passages 34, one for each cylinder of the engine 13. These intake passages 34 have traversing them a plurality of throttle valve shafts 35. Butterfly-type throttle valves 36 are connected to the throttle valve shafts 35 and control the flow through the intake passages 34 in a well-known manner. A linkage system indicated generally by the reference numeral 37 is mounted at one side of the induction system 28 and specifically one side of the throttle body 33 for controlling the simultaneous movement of the throttle valves 36 in a known manner.

Each throttle valve 36 may be provided with a small idle air flow passage 38 that permits flow into a discharge section 39 of each intake passages 34 even when the throttle valve 36 is fully closed. These passages 38 are formed at a specific location for a reason which will be described.

The throttle body 33 has a flange portion 41 that permits it to be affixed to the crankcase member 21 with each discharge section 39 being in registry with an intake port 42 formed therein. Each intake port 42 serves a respective one of the crankcase chambers 23 each of which, as has been noted, is associated with a respective cylinder bore 17. A reed-type check valve assembly 43 is provided in each intake port 42 so as to permit the intake charge to enter the crankcase chambers 23 when the pistons 26 are moving upwardly during a suction cycle. However, when the pistons 26 move downwardly to compress the charge, then the reedtype check valves 43 will preclude reverse flow.

An injector chamber 44 is formed in the throttle body 33 at one side of the intake passages 34. Electronically operated fuel injectors 45 are mounted in the throttle body 33 and have their spray nozzles 46 disposed so as to spray into the throttle body discharge sections 39. The throttle valve passages 38 are disposed in this area so as to generate a high velocity flow even at low throttle valve settings that will aid in the fuel distribution.

A fuel rail 47 is affixed to the fuel injectors 45 and delivers fuel to them from a fuel supply system that will be described in more detail by reference to FIG. 3.

The fuel/air charge which is delivered to the crankcase chambers 23 from the induction system 28 will be compressed, as aforenoted. This charge is then transferred through scavenge passages, which appear partially in FIG. 3 and are identified by the reference numeral 48 to the combustion chambers formed by the cylinder head recesses 19, cylinder bores 17, and heads of the pistons 26 in a manner well-known in this art.

Spark plugs 49 are mounted in the cylinder head assemblies 18 and have their gaps extending into the cylinder head recesses 19 for firing the thus delivered charge. This charge will then burn and expand so as to drive the pistons 26 downwardly. The manner of firing the spark plugs will be described later by reference to FIG. 3.

As the charge expands and the pistons 26 move downwardly they will eventually open exhaust ports 51 (FIG. 3) formed in the cylinder blocks 15 and 16 in a valley 52 formed therebetween. These exhaust ports 51 communicate with exhaust manifolds 53 that are formed integrally within the cylinder block assembly by means that include a cover plate 54. As seen in FIG. 3, the exhaust manifold 53 communicates with exhaust pipes 57 that depend into an expansion chamber 56 formed within the drive shaft housing 25.

From the expansion chamber 56 the exhaust gases are discharged to the atmosphere through any suitable type of exhaust system. As is typical with outboard motor practice, this exhaust system may include a high-speed underwater discharge and a low-speed above-the-water discharge. Again, since the invention deals primarily with the control system for the engine 13, this portion of the construction is not illustrated but may be of any type conventionally utilized in this art.

The control system for firing of the spark plugs 49 and also for controlling the fuel injectors 45 will now be described by particular reference to FIG. 3. First, the fuel supply system, indicated generally by the reference numeral 57 that supplies fuel to the fuel injectors 45 will be described by reference to the upper right-hand side of this figure. There is provided a remotely positioned fuel storage tank 58 from which fuel is drawn by a pumping arrangement that includes a high-pressure pump 59 through a fuel filter 61. This fuel is then delivered through appropriate conduits and quick disconnect connections to the power head. Mounted at an appropriate position on the fuel rail 47 is a pressure relief valve 62 that sets the maximum pressure in the fuel rail 47. This is done by dumping excess fuel back to the fuel tank 58 through a return conduit 63.

The timing of injection and duration of injection of fuel from the injectors 45 and timing of firing of the spark plugs 49 is controlled by an ECU, indicated schematically at 64. This ECU 64 may be conveniently mounted on the cover plate 54 in a cool location. The actual control strategy for controlling not only the timing of the spark plugs 49 and the timing and duration of fuel supplied by the injectors 45 may be of any known type. However, this control includes an oxygen sensor assembly, indicated generally by the reference numeral 65 and which has a construction as will be best described by reference to FIGS. 4–6.

In addition to this sensor, there are certain other signals that are transmitted to the ECU from various sensors. These sensors may include an engine temperature sensor, a crankshaft rotational position sensor 66 and intake air temperature sensor 67, a throttle position signal from a throttle position sensor 68 and other sensors such as ambient sensors such as atmospheric air pressure or cooling water inlet temperature. In addition, a back pressure signal indicative of the back pressure in the exhaust manifold 53 may also be provided. As is noted, the actual control strategy may be of any known type and may include a feedback control system.

Figure 4:
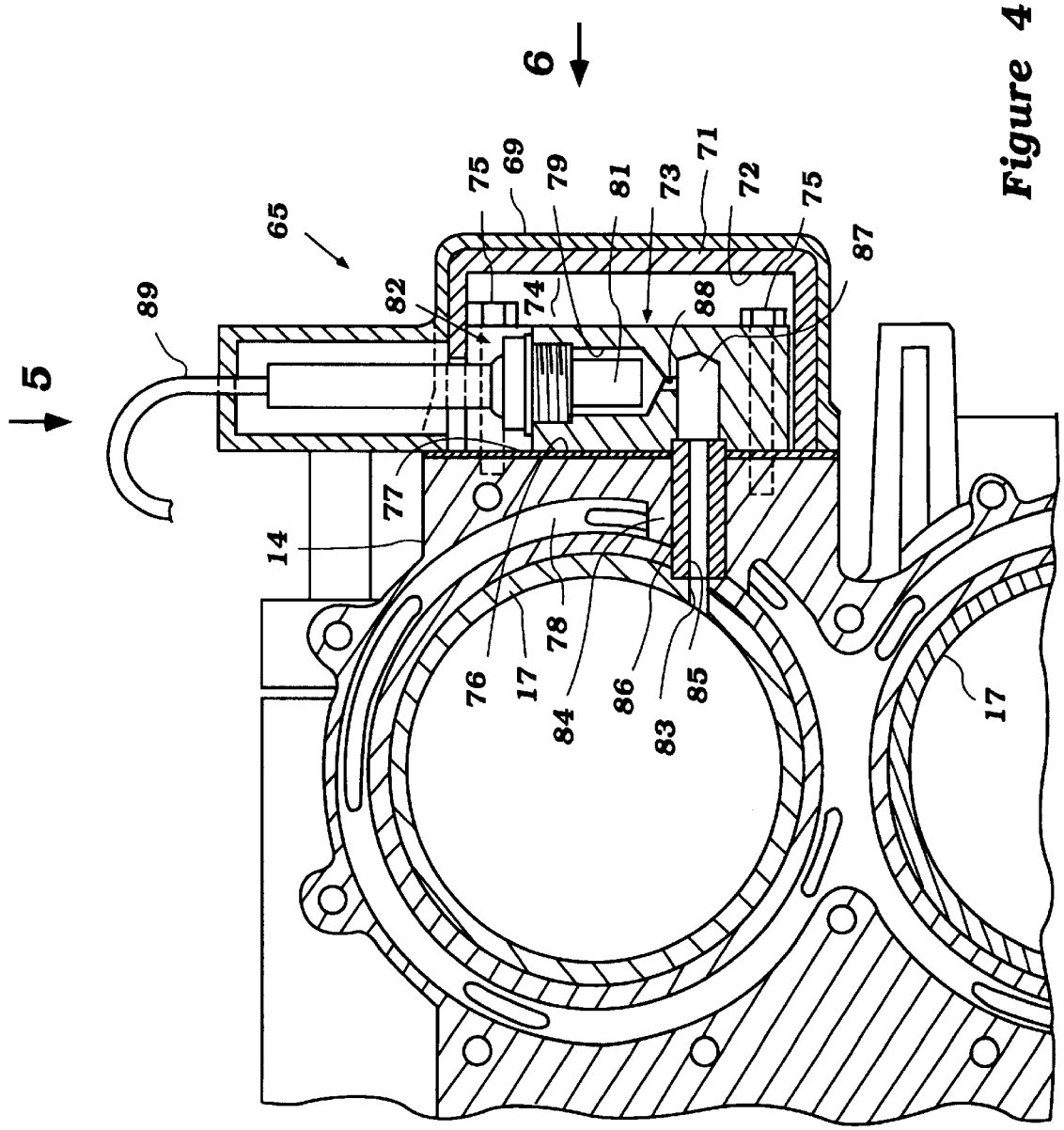
FIG. 4 is an enlarged cross-sectional view of the area encompassed by the circle 4 in FIG. 3 and shows a sensor and its communication with the combustion chamber of the engine in accordance with a first embodiment of the present invention.
Figure 5:
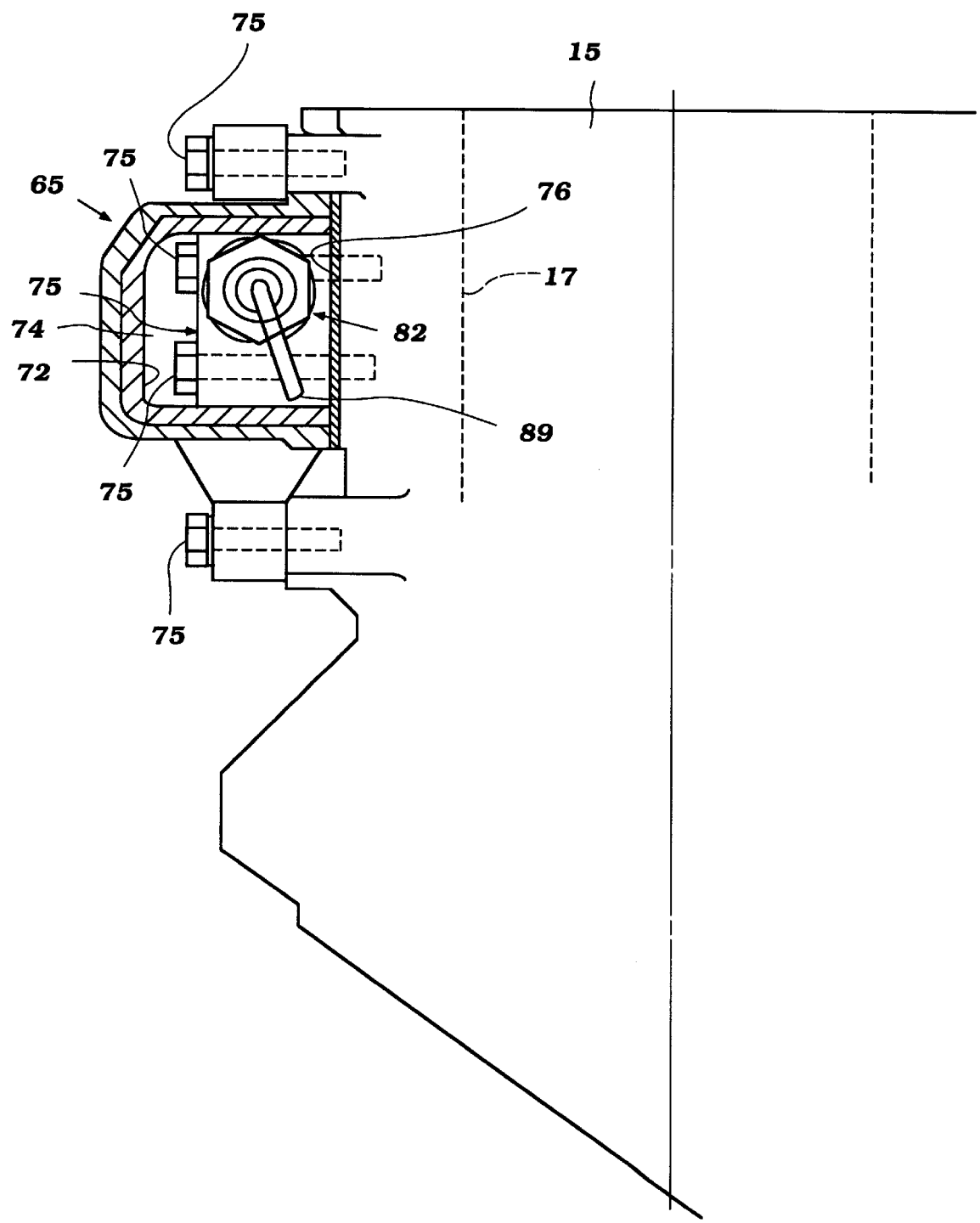
FIG. 5 is a view looking generally in the direction of the arrow 5 in FIG. 4 with a portion broken away and shown in section.
Figure 6:
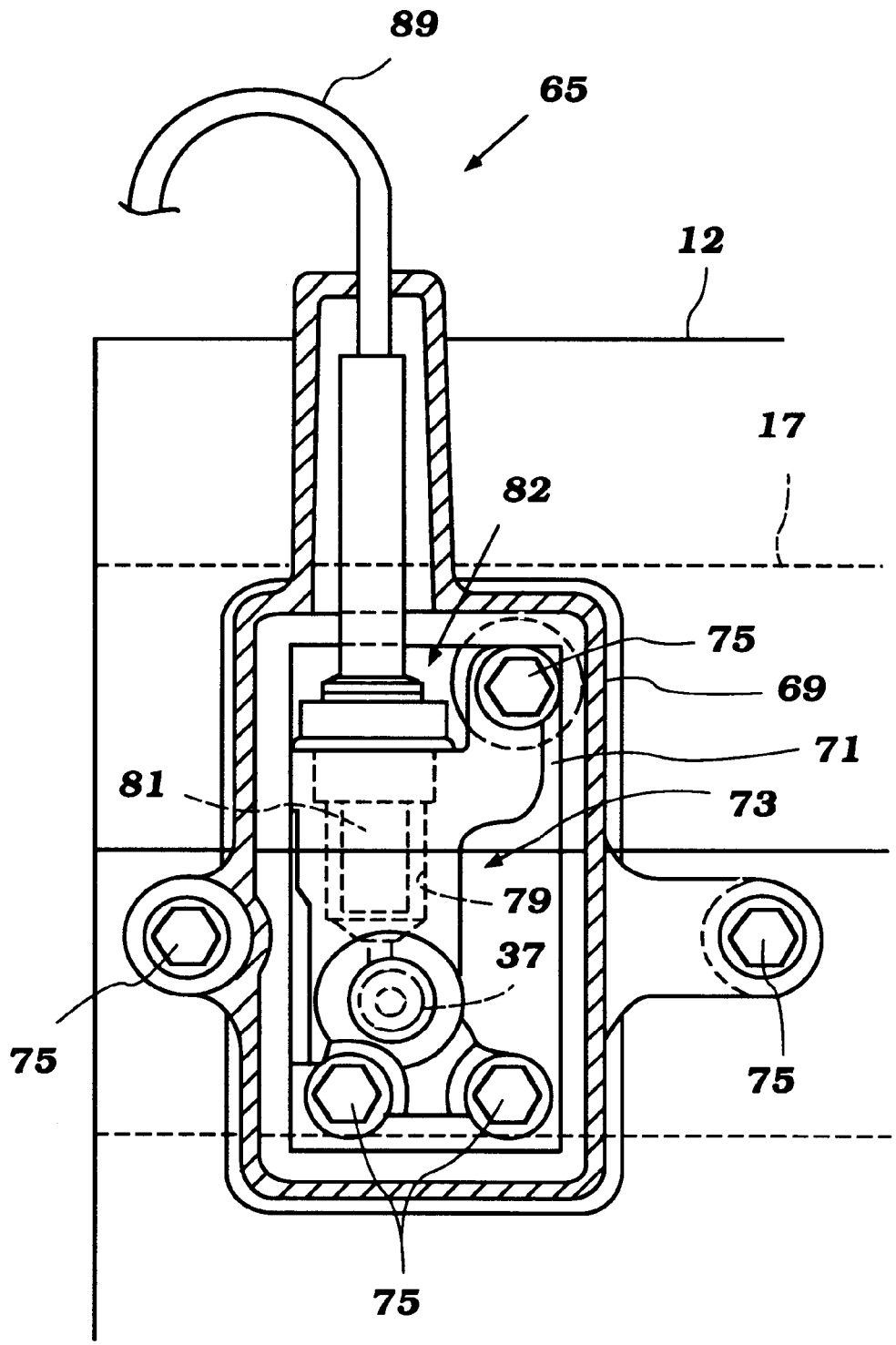
FIG. 6 is a view looking generally in the direction of the arrow 6 in FIG. 4 again with a portion broken away and shown in section.

The construction of the oxygen sensor assembly, indicated by the reference numeral 65 will now be described by primary reference to FIGS. 4–6. It should be noted that the oxygen sensor assembly 45 is mounted on one of the cylinder banks such as the cylinder bank 15 but preferably is disposed outside of the valley 52 between the cylinder banks. This assembly 65 includes an outer housing 69 which is formed from sheet metal or the like and which contains within it an insulating shell 71 formed from a suitable insulating material having a low coefficient of thermal conductivity and which has an inner surface 72 spaced from an inner sensor body assembly 73 so as to provide an insulating air gap 74. This assembly is mounted to the cylinder block 14 by threaded fasteners 75.

A heat insulating gasket 76 is mounted between the body 73 and a surface 77 of the cylinder block 14 so as to minimize heat transfer between a sensor chamber 79 and the engine body. As has been noted, the engine 13 is water-cooled and the cooling jackets 78 which surround the cylinder bores 17 appear in FIG. 4.

The sensor body 73 is formed with the chamber 79 in which the sensor portion 81 of an oxygen sensor, indicated generally by the reference numeral 82 protrudes. This sensor chamber 79 receives exhaust gases or combustion products through a small port 83 that intersects the cylinder bore 17 at a point immediately adjacent the point where the exhaust port begins to open. This port is also spaced from the scavenge port so that any incoming scavenge charge will not pass into the sensor chamber 79.

A surrounding portion 84 of the cylinder block 14 is provided without any cooling jacket and a flow path 85 is provided by an insulating sleeve 86. The sleeve 86 has a substantially lower thermal conductivity than that of the cylinder block 14 and thus the combustion products that pass through the passage 85 will not exchange any significant heat to the cylinder block 14 where they may be cooled.

The passage 85 opens into a chamber 87 formed in the body 73 and which communicates with the sensor chamber 79 through a small orifice 88. As a result of this construction, it will be ensured that the exhaust gases that pass through the sensor chamber 79 will be at a high temperature and will not experience any significant cooling. In this way, not only will the temperature of the oxygen sensor 81 be maintained, but it will also be ensured that foreign particles will maintain in the vapor state and will not condense on the elements of the sensor.

A conductor 89 carries the signal from the sensor element 81 to the ECU 64 for the control purposes.

Thus, from the foregoing description it should be readily apparent that the described construction is extremely effective in providing a good sensor output and one in which the sensor temperature will be maintained high even though the exhaust products are only cyclically delivered to the sensor chamber. The flow arrangement provided will also ensure that the flow is somewhat restricted and thus will also ensure the maintenance of the desired operating temperature.

FIGS. 7–10 illustrate a second sensor mounting arrangement in accordance with the present invention. In this arrangement, like numbers have been utilized for like parts in the embodiment illustrated in FIGS. 1–6 and described above, with the designator "a" added thereto.

In this alternate embodiment, an outer housing 69a again contains within it an insulating shell 71a formed from a suitable insulating material having a low coefficient of thermal conductivity and which has an inner surface 72a spaced from an inner sensor body assembly 73a so as to provide an insulating air gap 74a.

Figure 7:
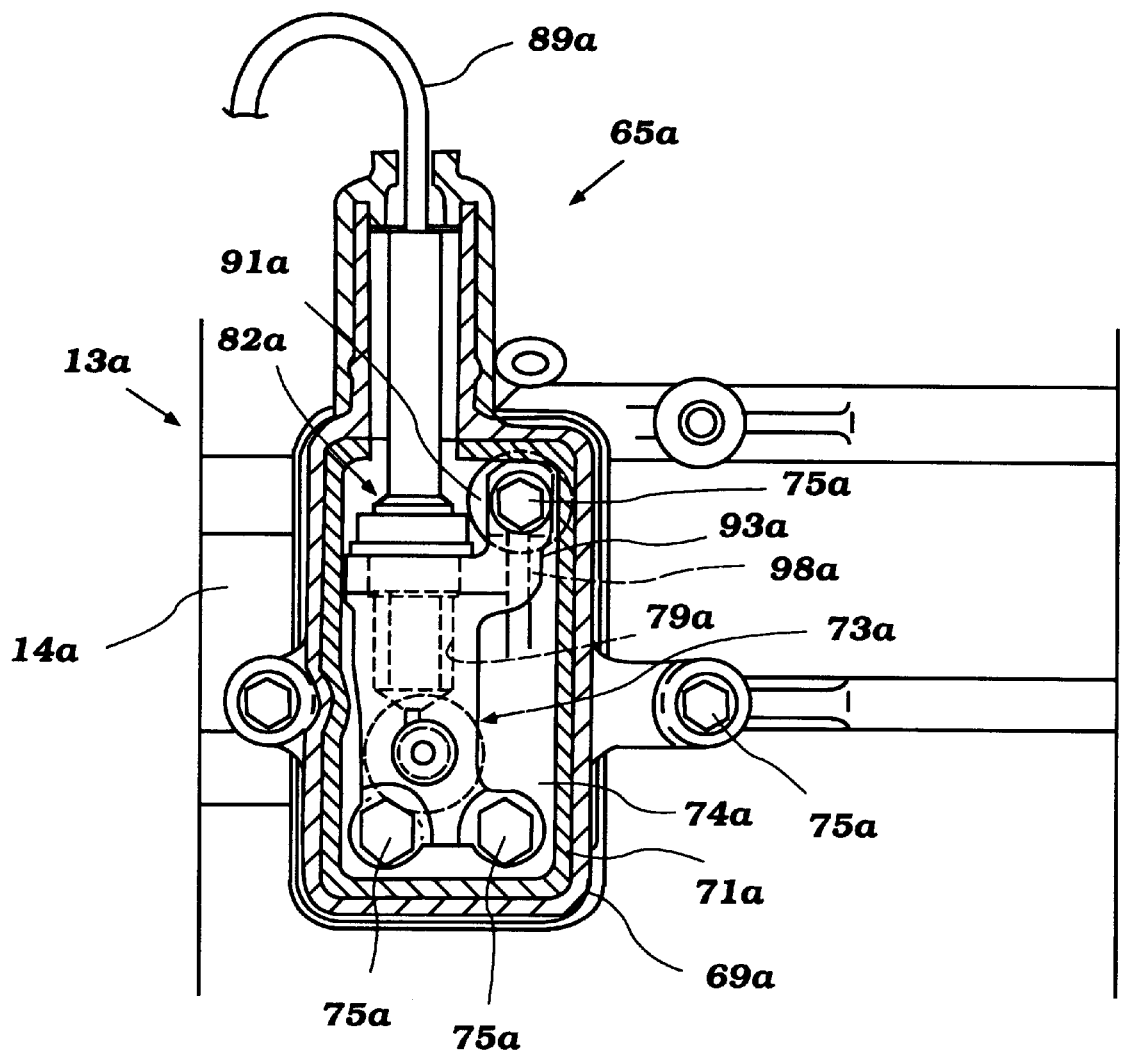
FIG. 7 is a view similar to tat illustrated in FIG. 6 of an alternate sensor and mounting arrangement in accordance with the present invention.

This housing assembly is mounted to a mounting portion or surface 77a of the cylinder block 14a by threaded fasteners 75a. As best illustrated in FIG. 6, the mounting surface 77a includes a boss parts 90a, 91a which are outwardly extending portions of the cylinder block, accommodating the mounting. The housing 69a includes a leg 93a for mounting to the most outwardly extending boss 91a, as illustrated in FIG. 7.

Figure 9:
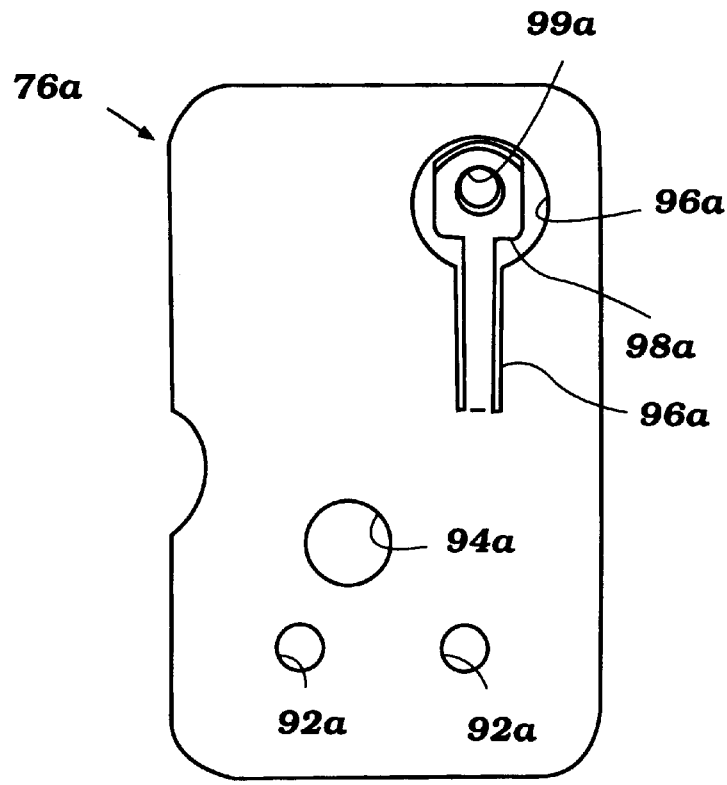
FIG. 9 is a front view of a gasket utilized in the sensor mounting arrangement illustrated in FIG. 7.

A heat insulating gasket 76a is mounted between the body 73a and a mounting surface 77a of the cylinder block 14a so as to minimize heat transfer between the sensor chamber 79a and the engine body. As best illustrated in FIG. 9, the gasket 76a has a pair of passages 92a to accommodate the passage of the mounting bolts 75a therethrough at the bottom end of the gasket. In addition, a gas flow passage 94a is provided, for reasons described below.

Figure 8:
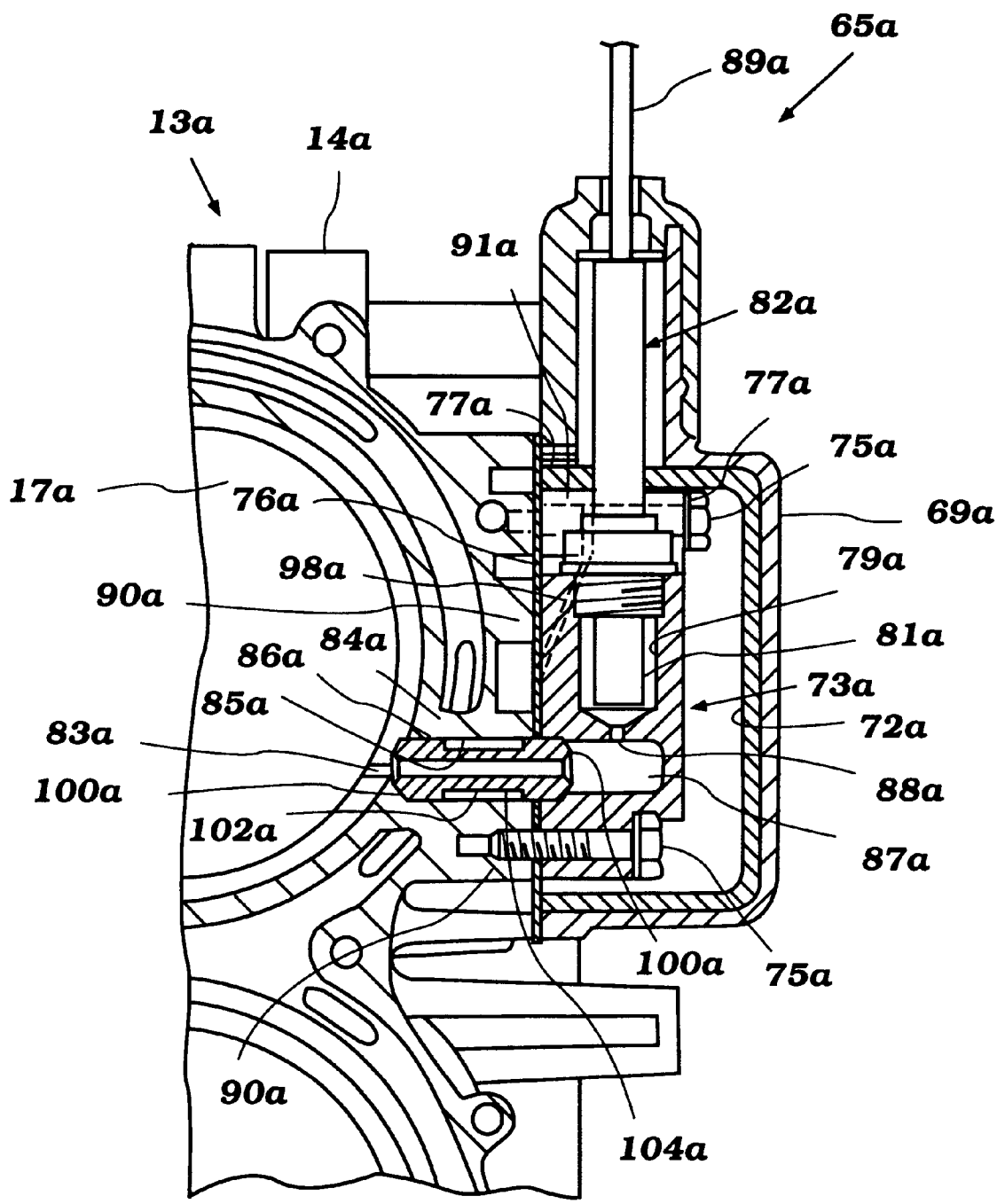
FIG. 8 is a view similar to FIG. 4 illustrating the sensor and mounting arrangement in accordance with FIG. 7.

A slit 96a is provided in the gasket 76a around a connected section 98a of the gasket. The connected section 98a is connected at the lower end to the gasket 76a, but freely movable in the slit 96a at the top end. The connected section 98a has a bolt passage 99a therethrough to accommodate the uppermost mounting bolt 75a. When installed, the connected section 98a extends outside of the plane of the remainder of the gasket 77a so as to be positioned between the outwardly most extending boss part 91a and the leg 93a, as best illustrated in FIG. 8.

The sensor body 73a is formed with the chamber 79a in which the sensor portion 81a of an oxygen sensor protrudes. This sensor chamber 79a receives exhaust gases or combustion products through a small port 83a that intersects the cylinder bore 17a at a point immediately adjacent the point where the exhaust port begins to open, and a connecting passage to the chamber 79a. This port is also spaced from the scavenge port so that any incoming scavenge charge will not pass into the sensor chamber 79a.

A surrounding portion 84a of the cylinder block 14a is provided without any cooling jacket. The connecting passage between the port 83a and chamber 79a is defined by a flow path 85a through an insulating sleeve 86a. As illustrated in FIG. 8, the sleeve 86a preferably extends from within a first passage in the cylinder block 14a to within a second passage within the sensor body 73a, through the passage 94a in the gasket 76a.

The sleeve 86a has a substantially lower thermal conductivity than that of the cylinder block 14 and thus the combustion products that pass through the passage 85a will not exchange any significant heat to the cylinder block 14a where they may be cooled.

Figure 10:
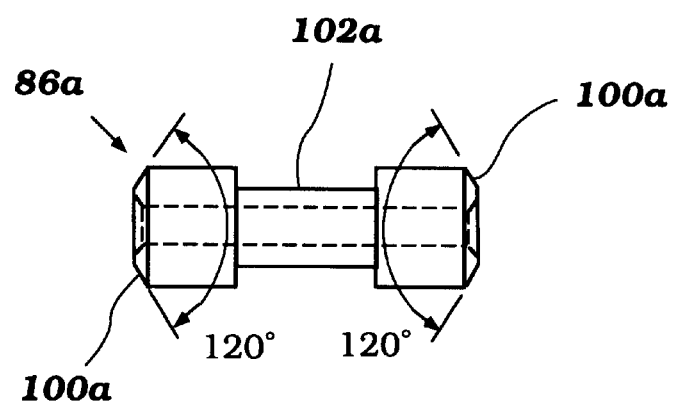
FIG. 10 is a side view of a sleeve of the sensor mounting arrangement illustrated in FIG. 7.

In order to reduce the heat transfer, the sleeve has tapered ends 100a. As illustrated in FIG. 10, the ends of the sleeve 86a are preferably tapered backwardly at an angle of about 30 degrees from vertical (vertical being that where the ends are flat), so that portions of one of the end surfaces opposite one another are positioned in planes which are 120 degrees apart.

As also illustrated in FIG. 10, a reduced diameter section 102a is provided between the ends 100a of the sleeve 86a. As best illustrated in FIG. 8, this reduced diameter section 102 cooperates with the cylinder block 14a to form a generally annular recess 104a between the sleeve and block between the ends of the sleeve 86a. This recess 104a acts as an insulating space, reducing the transfer of heat through the sleeve 86a to the block 14a.

The passage 85a through the sleeve 86a opens into a chamber 87a formed in the body 73a and which communicates with the sensor chamber 79a through a small orifice 88 as above. Again, a conductor 89a carries the signal from the sensor element 81a to an ECU or the like.

Preferably, the end of the bore in the cylinder block 14a in which the sleeve 86a is inserted is tapered for engaging the tapered end 10a of the sleeve 86a. Likewise, the end of the passage in the body 73a of the sensor 65a which houses the opposite end of the sleeve 86a is tapered. In this manner, when the sleeve 86a is installed in the space defined by the block 14a and body 73a, the sleeve is constrained from movement in the axial and radial direction. Since the sleeve 86a has the same taper on both ends, it may be installed in any direction, simplifying manufacture and assembly of the sensor 65.

This arrangement has the advantages that the gasket 76a, including part 98a which extends between the boss part 91a and leg 93a, reduces the heat transfer from the sensor 65a to the block 14a. As stated above, since the exposed ends surfaces of the sleeve 86a are reduced in size, heat transfer through the sleeve to the block 14a is also reduced. In addition, the reduced diameter section 102a of the sleeve 86a cooperates with the block 14a to form an insulating space 104a which also limits the transfer of heat between the sleeve and block. These features prevent the temperature of the exhaust gas which is transmitted to the sensor 65a from decreasing, preventing the above-stated problems, and improving the accuracy of the exhaust gas measurement.

Also, the insulating space 104a serves as an insulator which prevents the exhaust gas from cooling when the engine is first started and the block 14a and surrounding sensor parts are very cool, permitting good exhaust gas measurement even early after the engine has been started. This also serves to prevent carbon build-up which tends to result in these sensors when the engine is first started and the sensor parts are cold, serving to extend the life of the sensor 65a.

Of course, the foregoing description is that of preferred embodiments of the invention, and various changes and modifications may be made without departing from the spirit and scope of the invention, as defined by the appended claims.

What is claimed is:

1. A combustion condition sensor for an internal combustion engine having an engine body defining a combustion chamber, said sensor including a sensor body connected to said engine body and including a sensor element, said sensor body defining a sensing chamber, a first passage leading from said combustion chamber through said engine body and a second passage leading through said sensor body to said sensing chamber, a sleeve having enlarged end portions each of which is positioned at least partially in a respective one of said first and second passages, said sleeve having a reduced diameter portion extending between said end portions and spaced inwardly from the portion of said engine body to form an insulating air gap therebetween, said sleeve being constructed of a material having a lower thermal conductivity than the material from which said engine body is constructed, said sleeve defining a passage therethrough communicating with said first and second passages, said sensor element extending into said sensing chamber for sensing gas flowing from said combustion chamber to said sensing chamber, and a thermally insulating element provided between said sensor body and said engine body.

2. The sensor arrangement in accordance with claim 1, wherein said sleeve ends are tapered.

* * * * *